United States Patent [19]
Nelson

[11] Patent Number: 5,159,485
[45] Date of Patent: Oct. 27, 1992

[54] SYSTEM AND METHOD FOR UNIFORMITY OF ILLUMINATION FOR TUNGSTEN LIGHT

[75] Inventor: William E. Nelson, Dallas, Tex.

[73] Assignee: Texas Instruments Incorporated, Dallas, Tex.

[21] Appl. No.: 852,883

[22] Filed: Mar. 17, 1992

Related U.S. Application Data

[63] Continuation of Ser. No. 636,525, Dec. 31, 1990, abandoned.

[51] Int. Cl.⁵ .................... G02B 26/00; G02B 13/08
[52] U.S. Cl. .................... 359/291; 359/668; 359/846; 353/122
[58] Field of Search ............ 350/420, 360, 607, 611; 346/160; 353/122; 359/668, 846, 204

[56] References Cited

U.S. PATENT DOCUMENTS

| | | | |
|---|---|---|---|
| 3,041,935 | 7/1962 | Jacobsen | 350/420 |
| 4,596,992 | 6/1986 | Hornbeck | 350/360 |
| 4,678,321 | 7/1987 | Inokuchi | 350/420 |
| 4,744,073 | 5/1988 | Sugiki | 350/420 |
| 4,859,012 | 8/1989 | Cohn | 350/96.24 |

Primary Examiner—Eugene R. LaRoche
Assistant Examiner—Michael B. Shingleton
Attorney, Agent, or Firm—Julie L. Reed; James C. Kesterson; Richard L. Donaldson

[57] ABSTRACT

There is disclosed an optic system for illuminating a DMD array in a manner for efficient light transfer to an imaging lens. The DMD is positioned between the light source and the lens aperture. An anamorphic optic path is arranged such that the vertical component of the light is compressed to match the physical shape of the DMD array. In this manner the horizontal light component is focused directly on the aperture while the vertical light component is focused optically ahead of the aperture. Together the two light components entirely fill the lens aperture while providing more light intensity at the DMD.

14 Claims, 2 Drawing Sheets

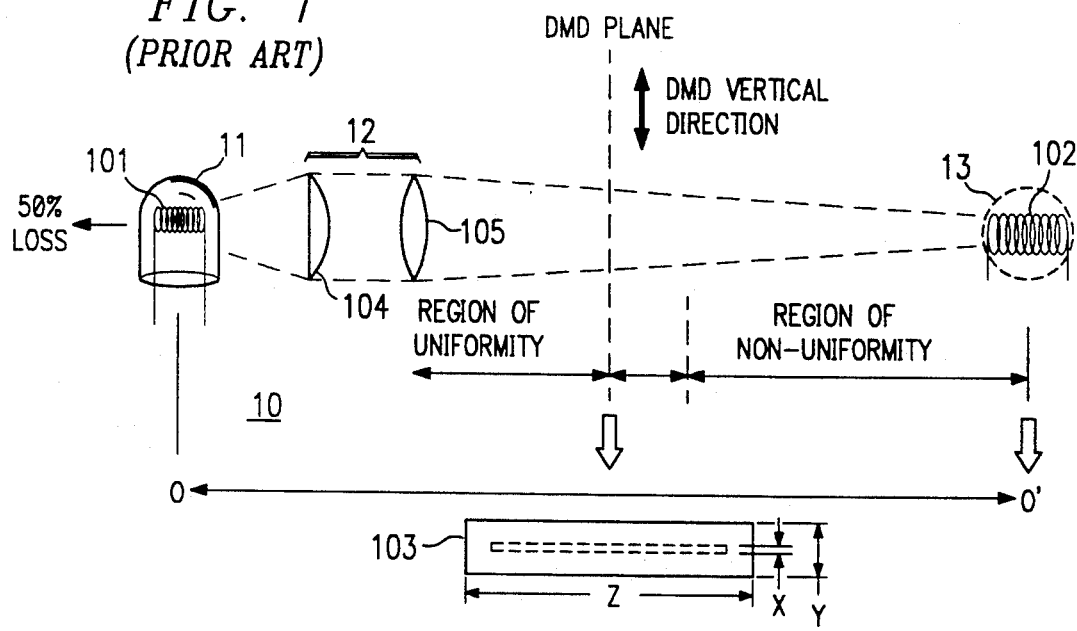
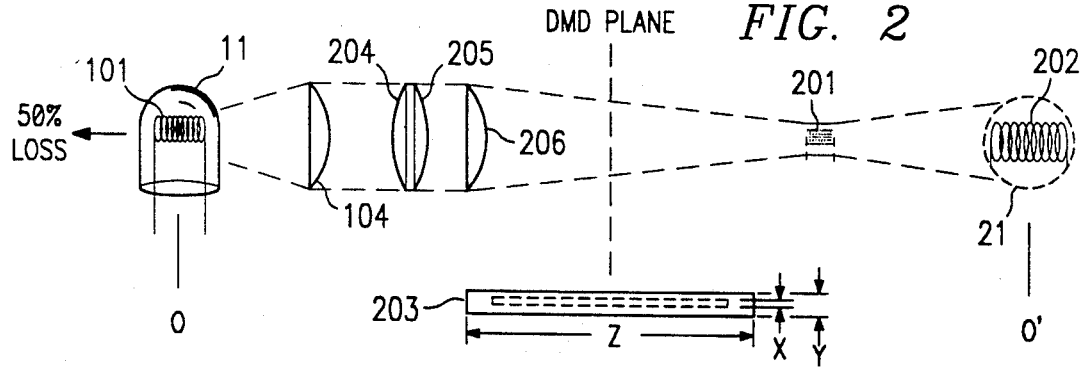
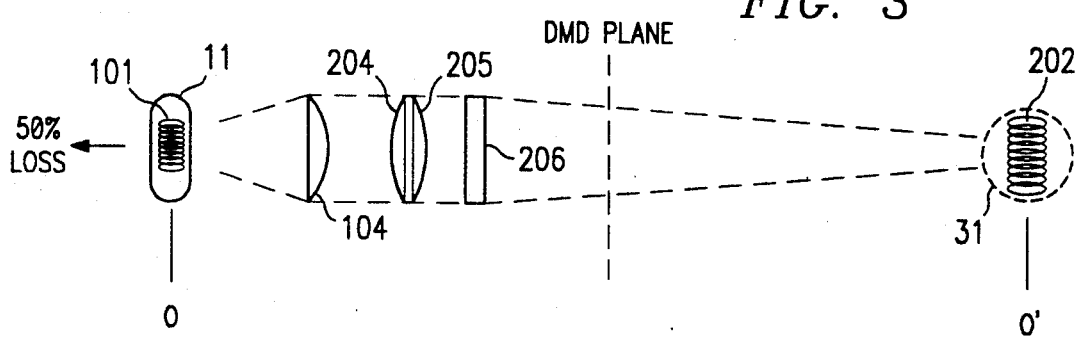

SYSTEM AND METHOD FOR UNIFORMITY OF ILLUMINATION FOR TUNGSTEN LIGHT

This application is a Continuation of application Ser. No. 07/636,525 filed Dec. 31, 1990, which is now abandoned.

TECHNICAL FIELD OF THE INVENTION

This invention relates to DMD arrays and more particularly to an anamorphic optical path for increasing light transfer efficiency.

BACKGROUND OF THE INVENTION

The use of semiconductor light modulators is gaining in popularity as a replacement for the laser polygon scanner in xerographic printing processes. A technology of preference, due to its monolithic, semiconductor fabrication process, is the deformable mirror device (DMD). Copending patent application entitled "Spatial Light Modulator Printer and Method of Operation", Ser. No. 07/454,568, assigned to the common assignee with this patent application, which patent application is hereby incorporated by reference herein, discusses one embodiment of a DMD device using a tungsten light focused via optics on a DMD array. While the invention in that application functions very well, several areas of improvement have become apparent.

These improvements center around the reduction in power consumed, reduction in physical size and uniformity of light modulation across the DMD array. Tungsten sources, like all incandescent filaments, emit light, more or less isotropically, which must be gathered and focused if the light energy is to be efficiently utilized. In addition, a major byproduct of incandescent light is the production of heat which in turn demands an ability of dissipating the heat. This, in turn, requires bulky structures, or plenums, to move the heat away from the source, as well as fans with inherent noise/reliability issues.

Because incandescent light is lambertian in its emission character, the rays must be collected from all sides of the filament and focused, thereby requiring fast optics which again argues for large size and cost, to avoid wasted power due to collection inefficiencies.

Accordingly, one problem in prior art DMD structures is the excessive power required to support the light source coupled with large size, both for the optics and for heat disposition. The aforementioned patent application shows the DMD array positioned in the light energy stream between the light source and the imaging lens aperture. In order to achieve maximum energy transfer, it is necessary to fill the imager aperture with the modulated filament image from the DMD array. The imager lens is designed, for cost and other reasons, to be round and thus a square filament image aspect ratio magnified to overfill the imager, must be presented to the lens to insure that the lens is filled. This arrangement, while performing properly, suffers from the problem that not all of the power modulated by the DMD can be passed by the imaging lens, and not all of the light collected by the condenser lenses can be concentrated on the DMD active area.

The latter problem exists for printing systems in that a DMD array is necessarily elongated or linear in aspect, and thus the light pattern reaching the array must be wider than it is high by a significant proportion, compared to either the filament aspect ratio or the aperture of the imager, both of which can be thought of as approximated by a square. Because the source must simultaneously come to focus on the imaging lens circular aperture and at the same time uniformly illuminate the full length of the DMD modulator which is maintained between the aperture of the collimator lens and the focusing lens and since the DMD device is substantially wider than it is high, in order to fully illuminate the array the resulting aspect of the light necessitates considerable width of illumination above and below the active area of the DMD device that is subsequently "wasted".

Another problem is that the focused image from the DMD is continuously projected onto a moving drum. Thus, during the exposure period of a dot-line, for any pixel image location the drum will rotate a given distance and broaden or blur that pixel image. A plot of the light energy on the drum for that pixel location will reveal that the maximum light energy transferred to that pixel will reach a peak level only at the centroid of the pixel and will build up to that point and fall off from that point in the shape of a pyramid. This pyramidal spreading of the pixel energy is not optimum for minimum feature formation and thus reduces the sharpness of the xerographic image in the process direction.

Thus, it is one problem of DMD devices that this invention addresses that the light source must generate orders of magnitude more energy than is actually captured and utilized for proper xerography.

It is a further object of this invention to provide a light modulation system which allows for an improved energy transfer to and from each pixel thereby permitting methods of operating the system that improve the sharpness of the resulting image.

SUMMARY OF THE INVENTION

A dramatic increase in optical efficiency can be achieved by anamorphically compressing that portion of the illumination which falls above (or below) the active area of a DMD device in the vertical direction in a manner selected to allow the filament image to form and subsequently diverge well beyond the DMD device so as to just overfill the imaging lens aperture. The illumination pattern which falls on the longer (tangential aspect) of the DMD active area, however, continues to converge to form a focused filament image directly on the imaging lens aperture. This effectively achieves more power per unit area at the DMD, since the vertical band of light energy compressed to irradiate the DMD plane more intensely will still diverge to a bundle of light energy that can be accepted by the imaging lens, thereby satisfying the requirement for maximum power transfer.

Using this arrangement, the typically rectangular filament image presentation of the source at the circular aperture of the imaging lens is first compressed in the vertical direction and then diverged, also in the vertical direction, so that the aperture of the imaging lens is completely filled, or overfilled as desired, thus allowing the system to operate at the full solid angle of the imager system for maximum efficiency.

One technical advantage of this invention is the anamorphic compression of the light filament image in one direction to coincide with the structure of the DMD device while allowing for that same image to be expanded to fill the imaging aperture.

Another technical advantage of this invention is that the actual physical aspect ratio of the filament can be made longer and narrower and thus, given the same filament temperature, will illuminate the DMD device more efficiently at a lower total power dissipation.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 1 shows a prior art DMD light modulator schematic;

FIG. 2 shows in schematic form one embodiment of the DMD light modulator arrangement of this invention;

FIG. 3 shows the top schematic view of the embodiment of FIG. 2.

DETAILED DESCRIPTION OF THE INVENTION

Figure 4:
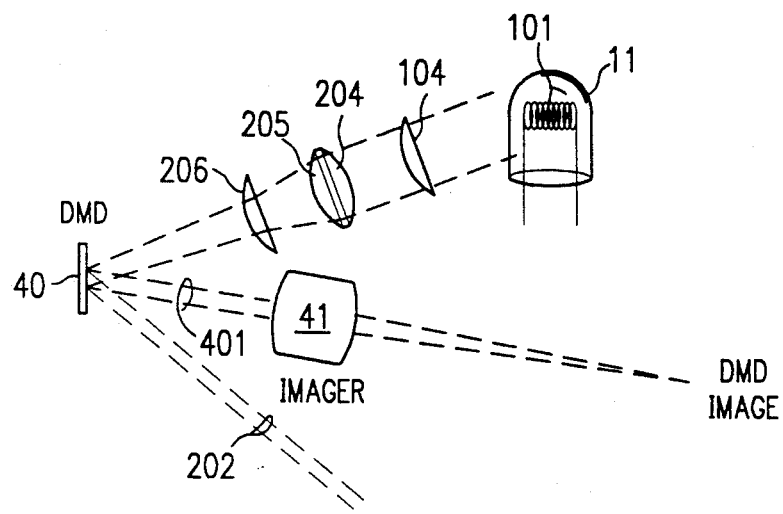
FIG. 4 shows the folded optics of one embodiment of the invention.

FIG. 1 shows a prior art system where light source 11 is a conventional tungsten filament lamp. As indicated, half of the light from filament 101 exits the back side and is unrecoverable. The light source is thus effectively a flat plate radiator from which light can be collected only in the forward hemisphere. This is accomplished by lens 104 which is part of a conventional spherical collimator assembly. The light is then shaped by lens 105, and the focus of the image of the filament from O to its conjugate plane O' is shown as filament image 102 within circle 13. Typically the filament is magnified to match the aperture of the imager lens 13.

Usually there is some intermediate region (shown as DMD plane) where illumination on DMD 103 is shown as an area of height y and width z (into the page). Inside that is a small dotted area which is shown as height x, which is the actual DMD active area. This area should lie in a region that is close to the pupil of lens element 105 to achieve the required uniformity. However, it is desirable to move the DMD downstream in the converging beam of illuminating light because more energy per unit area would then be concentrated on the DMD. Unfortunately, however, this cannot be accomplished because of the loss of uniformity. Thus, the DMD must be near the exit pupil of lens 105. The price paid is the loss of power because the energy is spread over a larger area compared to the DMD, the illumination area being z by y, compared to the smaller DMD area, z by x. Thus, the dilemma in the conventional approach is in making the illumination profile fit the DMD, which is typically 250 times longer than it is high. This is impossible with conventional spherical optics and reasonable light sources and imager lens systems.

In FIG. 2 there is shown a proposed solution where the conventional filament 101 of bulb 11 impacts the first condenser lens 104 as before. The system is then improved with the introduction of a different set of spherical elements 204, 205 and a new element 206 which is an anamorphic lens that only affects the light in one direction. The effect on the light is such that when looking along the z axis into the page, the ray bundle is compressed along the y axis, which then causes the bundle of light in the critical y direction to approach and match the x dimension of the DMD, shown as 203 in FIG. 2. Lens 206 compresses the bundle of light without affecting its width z, resulting in more irradiance per unit area at the DMD.

In operation, a subordinate vertical filament image plane exists at 201, while the lateral image of the filament is available in the same plane as before, i.e., as shown within circle 13 of FIG. 1. The resulting image or ray-bundle 202 is shown within circle 21. What has effectively occurred is the compression in the vertical direction of the image of the rectangular filament. When the energy from the light bundle reaches the plane of the imager lens, it is no longer in focus, but that is not a requirement of the system as in the prior art. The discovered requirement is that the ray bundle fall on and approximately equal the size of the aperture of the imager lens as shown with circle 21. The image does not have to be perfectly focused, so long as the ray bundle satisfies the criteria that it fills the aperture of and transmits through the imager lens.

As a result, as shown in circle 21, the filament image or ray bundle 202 at O' is more magnified in the vertical direction than is image 102. This effect does a better job of filling the round imager lens aperture, and even though image 202 shows a well formed filament image, it is in fact only well formed in the lateral direction. In the vertical direction it is not focused at all. The essential criteria that the ray bundle follow the optical axis and pass through the imager lens is still met.

In FIG. 3 we show the top view of the prior figure. The DMD plane is again shown, the optics are the same as in FIG. 2. Element 206 is now shown in its true form from the vertical direction. It acts as a piece of flat glass. It has no effect on the energy, the width of the ray bundle coming through or the lateral filament image. It essentially lets all light rays pass as if it were not present, and image 202 falling in circle 31 at O' is essentially unaffected from a top view of FIG. 1. (not shown)

It should be noted that the schematic drawings of FIGS. 1, 2 and 3 show the DMD as though it were a transmissive element. This in practice is not the case. In particular, we are dealing with the problem of a lamp filament, image 102, as shown in FIG. 1, which is rather long compared to its height, and we are treating it with additional optics (FIG. 2) so that we are doing a better job of turning a long narrow filament into a square or approximately circular image 202 to fill the imager aperture. Thus, we have achieved the difficult task of taking light from a conventional filament and converting it to the profile of the DMD plane and subsequently also filling the imaging lens aperture, with either a square or a circular filament image shape.

FIG. 4 shows one structural embodiment of the invention. The rays from lamp 11 and filament 101 are now shown passing through optic elements 104, 204, 205 and 206 and falling onto DMD 40. The unmodulated component of the reflected rays are shown as ray bundle 202. These rays do not enter the system and are not used optically. Rays 401 are the modulated rays that will form images 102 and 202 that were discussed with respect FIGS. 1 and 2 and which are now brought to bear on imager lens 41 and which subsequently form the DMD image downstream in the image plane conjugate to DMD 40.

Figure 5:
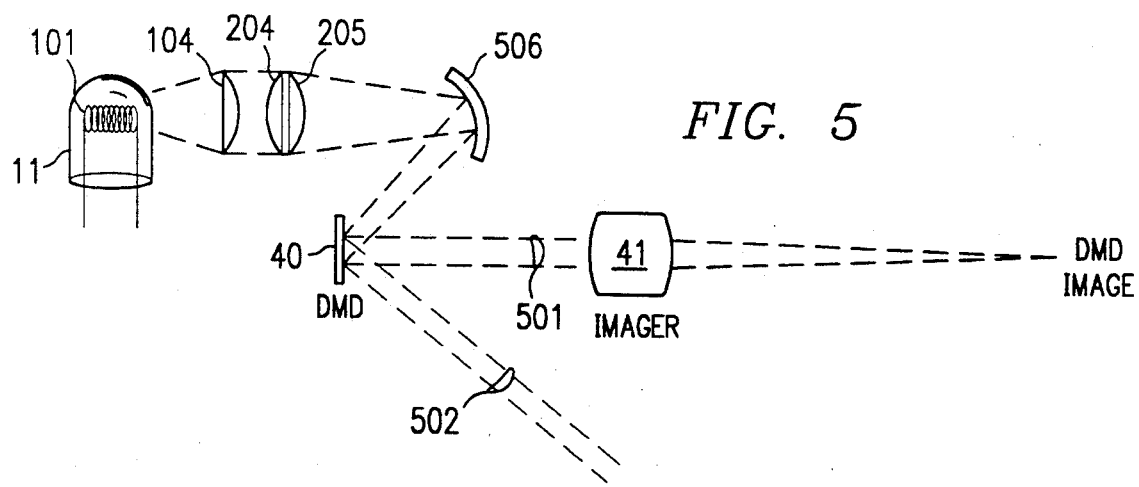
FIG. 5 shows another embodiment of the optics of the invention.

In FIG. 5 we show an alternate embodiment, again collecting the light from lamp 11 with lamp lens 104, operating on it with intermediate lenses 204 and 205. Then, instead of showing a transmissive anamorphic element (which would have been element 206 in FIG.

2), we show curved mirror 506 which is an anamorphic mirror element serving two purposes, namely 1) allowing the compression of the beam and the bundle of energy from the lamp filament in the desired direction, and 2) allowing the folding of the optic system so instead of having all the elements on the same side of the DMD (which tends to cause restrictions on how the device is packaged), we are able to put the lamp behind the DMD. Ray bundle 501 is the modulated light path, and ray bundle 502 is the unmodulated light path, similar to FIG. 4.

In principle, with mirror element 506, a much more compact packaging scheme is available with the lamp removed substantially from the vicinity of the DMD and the DMD imager. Thus, we are then able to take advantage of the reflective characteristics of element 506 to form a better image of the filament, since there is no distortion due to the fact that no refractive lens element is used. Element 506 could be simply a mirrored plastic surface or a mirrored glass surface.

Although this description describes the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A DMD system comprising:
    a light source;
    an imaging lens having an aperture;
    a DMD array, having a plurality of individual controllable pixels operable for modulating light from said light source, said array rectangular in shape and having a horizontal extent substantially greater than its vertical extent and positioned in the optic path between said light source and said lens; and
    anamorphic optics for establishing an image of said light source to fill said aperture of said imaging lens, said optics operable to compress the vertical component of said ray bundle an amount sufficient to more efficiently illuminate said DMD array in said vertical direction and to focus said vertical component light at a point in said optic path ahead of said imaging lens while said horizontal component of said light is focused directly on said aperture, positioned so as to receive light directly from said condensing optics, such that brightness and contrast are improved for said image.

2. The system set forth in claim 1 wherein said anamorphic optics includes:
    a light source having a light producing element having a horizontal width greater than its vertical height.

3. The system set forth in claim 2 wherein said anamorphic optics further includes:
    a lens curved in two planes and wherein the radius of curvature of each plane is different, and one radius may be infinite.

4. The system set forth in claim 2 wherein said anamorphic optics further includes a mirror for modifying the direction of travel of light from said light source.

5. The system set forth in claim 4 wherein said light source is positioned behind said DMD array.

6. The system set forth in claim 1 wherein the focal point of both the horizontal and vertical components of the image of said DMD device is on a moving xerographic surface behind said imaging lens and wherein said focal point image is rectangular in shape to match said shape of said DMD device.

7. An optic system for controlling light from a light source to an imaging lens, said light source providing illumination substantially wider than it is high an wherein it is desired to modify the illumination in its height while not affecting its width, said modification to occur at a point between said light source and said imaging lens, said system comprising:
    condensing optics to stop the divergence of said light as it moves away from said light source positioned adjacent said source;
    anamorphic optics positioned to receive said light directly from said condensing optics and to modify the focal plane of said received illumination in the height dimension while not affecting the focal plane of said illumination in the length dimension, so as to fill the aperture of an imaging lens, so as to increase both brightness and contrast; and
    a spatial light modulator positioned so as to receive and redirect maximum light energy in an image determined by said spatial light modulator from said anamorphic optics to said aperture.

8. The system set forth in claim 7 further comprising:
    a DMD array of pixels interposed between said anamorphic optics and said impinging lens;
    wherein the length of said illumination approximates said DMD active length; and
    wherein the height of said illumination from said anamorphic optics in said vertical illumination height approximates said DMD active area.

9. The system set forth in claim 8 wherein said anamorphic optics further includes:
    a lens curved in two planes and wherein the radius of curvature of each plane is different.

10. The system set forth in claim 8 wherein said anamorphic optics further includes a mirror for modifying the direction of travel of light from said light source.

11. The source set forth in claim 10 wherein said light source is positioned behind said DMD array.

12. The method of generating an optic image in a DMD system comprising the steps of:
    accepting light from a light source;
    presenting an image of said light to the aperture of an imaging lens;
    modulating said accepted light by a DMD array having a plurality of individual controllable pixels, said array rectangular in shape and having a horizontal extent substantially greater than its vertical extent and positioned in the optic path between said light source and said lens; and
    establishing, under control of anamorphic optics, an image of said light source to fill said aperture of said imaging lens, said optics operable to compress the vertical component of said light an amount sufficient to just illuminate said DMD array in said vertical direction and to focus said vertical component light at a point in said optic path ahead of said imaging lens while said horizontal component of said light is focused directly on said aperture, said anamorphic optics positioned in the optic path between said source and said DMD array, so as to increase both brightness and contrast of said image.

13. The method set forth in claim 12 wherein said establishing step includes the step of:

presenting said accepted light to a lens curved in two planes and wherein the radius of curvature of each plane is different.

14. The method set forth in claim 12 wherein said establishing step further comprises the step of:
    presenting the focal point of both the horizontal and vertical components of the image of said DMD device to a moving xerographic surface behind said imaging lens and wherein said focal point image is rectangular in shape to match said shape of said DMD device.

* * * * *